(12) United States Patent
Mizushima et al.

(10) Patent No.: US 7,236,440 B2
(45) Date of Patent: Jun. 26, 2007

(54) OPTICAL RECORDING MEDIUM

(75) Inventors: Tetsuro Mizushima, Chuo-ku (JP); Jiro Yoshinari, Chuo-ku (JP); Isamu Kuribayashi, Chuo-ku (JP); Masaki Aoshima, Chuo-ku (JP); Koji Mishima, Chuo-ku (JP)

(73) Assignee: TDK Corporation, Tokyo (JP)

( * ) Notice: Subject to any disclaimer, the term of this patent is extended or adjusted under 35 U.S.C. 154(b) by 580 days.

(21) Appl. No.: 10/480,922

(22) PCT Filed: Sep. 11, 2002

(86) PCT No.: PCT/JP02/09300

§ 371 (c)(1),
(2), (4) Date: Dec. 16, 2003

(87) PCT Pub. No.: WO03/025924

PCT Pub. Date: Mar. 27, 2003

(65) Prior Publication Data

US 2004/0174796 A1    Sep. 9, 2004

(30) Foreign Application Priority Data

Sep. 13, 2001    (JP) .............................. 2001-278080

(51) Int. Cl.
*G11B 7/24*    (2006.01)

(52) U.S. Cl. .................. 369/94; 369/275.2; 369/121; 369/283; 369/288

(58) Field of Classification Search .................. 369/94, 369/121, 275.2, 275.5, 284, 283, 288, 13.38; 430/270.13, 945; 428/64.1, 64.5

See application file for complete search history.

(56) References Cited

U.S. PATENT DOCUMENTS

| 6,280,810 B1 * | 8/2001 | Nakamura et al. .......... 369/283 |
| 6,312,780 B1 * | 11/2001 | Kasami et al. .............. 369/283 |
| 6,511,788 B1 * | 1/2003 | Yasuda et al. ........... 369/275.2 |

FOREIGN PATENT DOCUMENTS

| EP | 0 984 443 A1 | 3/2000 |
| JP | B2 4-838 | 1/1992 |

(Continued)

*Primary Examiner*—Andrea Wellington
*Assistant Examiner*—Kim-Kwok Chu
(74) *Attorney, Agent, or Firm*—Oliff & Berridge, PLC

(57) ABSTRACT

A high-speed, write-once type optical recording medium, which utilizes laser light that is either blue or an even shorter wavelength, as well as an optical recording method and an optical recording apparatus for recording onto this optical recording medium.

A high-speed, write-once type optical recording medium 10 having a recording layer 18 and a light transmission layer 22 formed sequentially on top of a support substrate 12, wherein the recording layer 18 is formed by laminating first and second vice-recording layers 18A, 18B which include Al and Sb respectively as primary components, and irradiation of a laser light of blue wavelength from a laser light source 24, through the light transmission layer 22 and onto the recording layer 18, causes diffusion and mixing of the Al and Sb contained within the first and second vice-recording layers 18A, 18B, and this mixing enables the formation of a recording mark based on an irreversible change in reflectance. The thickness of the recording layer 18 is set to enable recording at a recording transfer rate of at least 35 Mbps.

6 Claims, 4 Drawing Sheets

FOREIGN PATENT DOCUMENTS

| | | |
|---|---|---|
| JP | U 4-89374 | 8/1992 |
| JP | A 6-131693 | 5/1994 |
| JP | 06-171236 A | 6/1994 |
| JP | A 6-171236 | 6/1994 |
| JP | Y2 6-32372 | 8/1994 |
| JP | A 10-329426 | 12/1998 |
| JP | A 11-34501 | 2/1999 |
| JP | A 2000-99988 | 4/2000 |
| JP | 2000-187882 A | 7/2000 |
| JP | 2000-187884 A | 7/2000 |
| JP | A 2000-187882 | 7/2000 |
| JP | 2000-222764 A | 8/2000 |
| JP | A 2000-222764 | 8/2000 |
| JP | 2000-285509 A | 10/2000 |
| JP | A 2000-285509 | 10/2000 |
| JP | 2003-507218 A | 2/2003 |
| JP | 2003-263777 A | 9/2003 |
| WO | WO 99/44199 | 9/1999 |

\* cited by examiner

[Recording layer thickness and Reflectance prior to, and following, recording]

[Recording layer thickness and recordable laser power]

OPTICAL RECORDING MEDIUM

TECHNICAL FIELD

The present invention relates to an optical recording medium with a write-once recording layer, and more particularly to a high-speed, write-once type optical recording medium, an optical recording method, and an optical recording apparatus.

BACKGROUND ART

In recent years, optical recording media capable of high density, high-speed recording have been keenly sought, and optical recording media capable of undergoing recording and playback with laser beam at blue wavelengths are currently being investigated as one such possibility.

In addition, amongst the optical recording media utilizing this type of blue wavelength laser light, ROM (read only memory) type optical recording media and RW (rewritable) type optical recording media have been proposed, but no write-once type optical media capable of high-speed recording with laser light of a wavelength shorter than blue wavelengths have yet been proposed.

This is because conventionally, layers with a coating of an organic dye are widely used as the recording layer of write-once type optical recording media, but these organic dyes offer inadequate recording sensitivity for high-speed recording, and if the wavelength of the laser light is shortened to improve the recording density, then synthesis of a dye suitable for use with a short wavelength laser light that is either blue or an even shorter wavelength is very difficult.

Furthermore, high-speed recording with a blue wavelength laser light that utilizes a phase-change material in the recording layer has also been proposed, but no write-once type media have been reported.

In addition, media with recording layers formed from inorganic materials also exist, but these media suffer many problems including being unsuitable for high-speed recording, offering unsatisfactory storage reliability in a recorded state, and displaying poor reproductive durability, and in all cases, the media are unsuitable for high-speed, write-once type recording.

DISCLOSURE OF THE INVENTION

The present invention takes the conventional problems described above into consideration, with an object of providing a high-speed, write-once type optical recording medium, an optical recording method and optical recording apparatus with good long term storage reliability and good reproductive durability, which utilizes an inorganic material, and is suitable for high-speed, write-once type optical recording using a short wavelength laser light that is either blue or an even shorter wavelength.

The above object is achieved through the following aspects of the present invention.

(1) A high-speed, write-once type optical recording medium comprising at least a recording layer and a light transmission layer formed sequentially on top of a support substrate, the optical recording medium characterized in that the recording layer is formed by laminating at least two vice-recording layers, each of which comprises one type of metal as a primary component, and irradiation of a laser light that is either blue or an even shorter wavelength, from the side of the light transmission layer, causes diffusion and mixing of the primary component metals contained within each of the vice-recording layers, this mixing enables the formation of a recording mark based on an irreversible change in reflectance, and recording can be conducted at a recording transfer rate of at least 35 Mbps by using a system in which the thickness of the recording layer is from 3 to 50 nm, the wavelength of the laser light is from 200 to 450 nm, and which utilizes a lens system having an objective lens used for irradiation of the laser light, the numerical aperture of the objective lens being at least 0.8.

(2) The high-speed, write-once type optical recording medium according to the aspect (1), wherein the thickness of the vice-recording layer is from 1 to 30 nm.

(3) The high-speed, write-once type optical recording medium according to either the aspect (1) or aspect (2), wherein the thickness of the light transmission layer is from 50 to 150 μm.

(4) The high-speed, write-once type optical recording medium according to the aspect (1), aspect (2) or aspect (3), wherein at least one layer of the vice-recording layers comprises Al as a primary component, and at least one other layer is provided adjacent to the vice-recording layer comprising Al as a primary component, and comprises Sb as a primary component, and irradiation of the laser light causes diffusion and mixing of the Al and Sb contained within each of the vice-recording layers.

(5) The high-speed, write-once type optical recording medium according to the aspect (1), aspect (2) or aspect (3), wherein at least one layer of the vice-recording layers comprises Si as a primary component, and at least one other layer is provided adjacent to the vice-recording layer comprising Si as a primary component, and comprises Cu as a primary component, and irradiation of the laser light causes mixing of the Si and Cu contained within each of the vice-recording layers.

(6) The high-speed, write-once type optical recording medium according to the aspect (1), aspect (2) or aspect (3), wherein the combination of the primary component metal in at least one layer of the vice-recording layers, and the primary component metal in at least one other secondary layer provided adjacent thereto, is selected from the group consisting of Ag/Si, Zn/Si, Au/Si, Al/Ge, Cu/Ge, Ag/Ge, Zn/Ge, and Au/Ge, and irradiation of the laser light causes mixing of the two primary component metals contained within each of the vice-recording layers.

(7) An optical recording method in which a recording layer of an optical recording medium formed by providing at least the recording layer and a light transmission layer sequentially on top of a support substrate is irradiated with laser light from the side of the light transmission layer to form a recording mark, the method characterized in that the laser light is either blue or an even shorter wavelength, the recording layer is formed by laminating at least two vice-recording layers, each of which comprises one type of metal as a primary component, the irradiation of the laser light causes diffusion and mixing of the primary component metals contained within each of the vice-recording layers, this mixing forms a recording mark based on an irreversible change in reflectance, and recording is conducted at a recording transfer rate of at least 35 Mbps.

(8) The optical recording method according to the aspect (7), wherein the wavelength of the laser light is from 200 to 450 nm, and the laser light is irradiated from the side of the light transmission layer, which has a thickness of 50 to 150 μm, through an objective lens with a numerical aperture of at least 0.8 and onto the recording layer.

(9) A high-speed, write-once type optical recording apparatus comprising a laser light source for emitting a laser light that is either blue or an even shorter wavelength, a recording optical system for guiding laser light from the laser light source onto a recording layer of an optical recording medium formed by providing at least the recording layer and a light transmission layer sequentially on top of a support substrate, and for converging the light from the side of the light transmission layer onto the recording layer, and an optical recording medium drive device for supporting the optical recording medium and moving the optical recording medium relative to the position of convergence of the laser light, the apparatus characterized in that the recording layer is formed by laminating at least two vice-recording layers, each of which comprises one type of metal as a primary component, and irradiation of a laser light that is either blue or an even shorter wavelength causes diffusion and mixing of the primary component metals contained within each of the vice-recording layers, this mixing enables the formation of a recording mark based on an irreversible change in reflectance, and the irradiation energy of the laser light, the relative speed of movement of the optical recording medium and the thickness of the recording layer enable recording by the laser light to be conducted at a recording transfer rate of at least 35 Mbps.

(10) The high-speed, write-once type optical recording apparatus according to the aspect (9), wherein the wavelength of the laser light is from 200 to 450 nm, and the numerical aperture of the objective lens in the recording optical system is at least 0.8.

BEST MODE FOR CARRYING OUT THE INVENTION

A detailed description of embodiments of the present invention will be described hereinafter with reference to the drawings.

Figure 1:
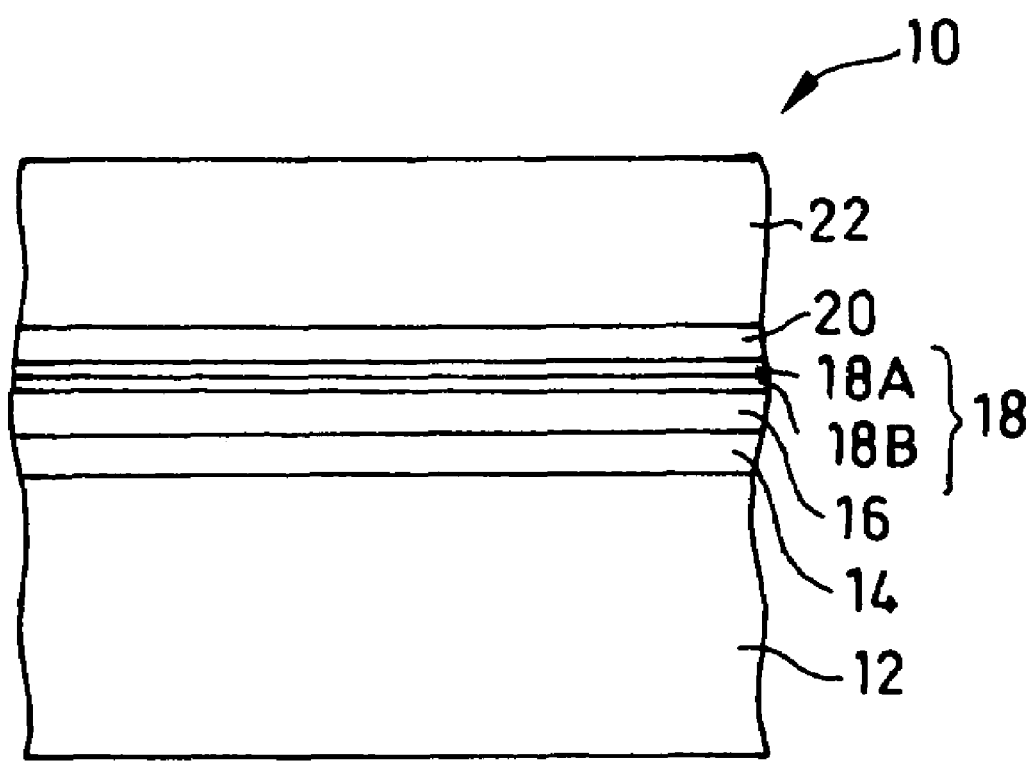
FIG. 1 is a cross-sectional view showing an enlarged schematic representation of a high-speed, write-once type optical recording medium according to a first embodiment of the present invention.

As shown in FIG. 1, a high-speed, write-once type optical recording medium (hereafter described as an optical recording medium) 10 according to an embodiment of the present invention includes a reflective layer 14, a second dielectric layer 16, a recording layer 18, a first dielectric layer 20, and a light transmission layer 22 provided sequentially on top of a support substrate 12, and by irradiating laser light of a wavelength from 200 to 450 nm, for example blue laser light of wavelength 405 nm, from a recording laser light source 24, through the light transmission layer 22 and onto the recording layer 18, the reflectance of the irradiated area can be changed, generating a recording mark.

The recording layer 18 is formed by laminating a first vice-recording layer 18A comprising Al as the primary component, and a second vice-recording layer 18B comprising Sb as the primary component. When blue laser light is irradiated as recording light onto this laminated recording layer, then within the irradiation area, the Al and Sb that represent the primary component metals contained within the first and second vice-recording layers 18A, 18B diffuse and mix, and the reaction products generated by this mixing change the reflectance of the irradiated area, and this becomes a recording mark. Because this type of diffusion and mixing reaction of the two primary component metals is irreversible, the recording layer 18 is capable of write-once type optical recording.

The support substrate 12 is formed from, for example, a polycarbonate of thickness 1.1 mm, and the reflective layer 14 is a layer of silver alloy or the like, formed on top of the support substrate 12 using a sputtering method or the like, with a thickness of 10 to 200 nm.

The first and second dielectric layers 16, 20 are both formed by sputtering using a ZnS—SiO$_2$ target (ZnS: 80 mol %, SiO$_2$: 20 mol %), with the second dielectric layer 16 formed with a thickness of 5 to 200 nm on top of the reflective layer 14, and the first dielectric layer 20 formed with a thickness of 5 to 200 nm, so as to sandwich the recording layer 18 between the first dielectric layer 20 and the second dielectric layer 16.

The light transmission layer 22 is formed on top of the first dielectric layer 20, either by spin coating, or by bonding a preformed sheet type member, and comprises, for example, an ultraviolet light curing resin layer or a polycarbonate sheet with a thickness of approximately 100 μm.

The thickness of the recording layer 18 is from 3 to 50 nm, and preferably from 5 to 20 nm. This thickness value is selected so that when blue laser light of wavelength 405 nm is irradiated onto the recording layer 18, the Al and Sb, or alloys thereof, that represent the primary component metals contained within the first and second vice-recording layers 18A, 18B, are capable of mixing to form recording marks with a recording transfer rate of at least 35 Mbps (described in detail later).

What is described here as a recording transfer rate of 35 Mbps refers to a recording transfer rate that takes efficiency into consideration, so that using the (1,7) RLL modulation system, with a channel bit length of 0.12 μm, a recording linear velocity of 5.3 m/s, and a channel clock of 66 MHz, the format efficiency is 80%.

The thickness of the light transmission layer 22 and the first dielectric layer 20 are selected so that when the numerical aperture (NA) of an objective lens 26 that irradiates the laser light from the laser light source 24 onto the recording layer 18 is set to 0.85, blue laser light is converged onto the recording layer 18.

Furthermore, the second and the first dielectric layers 16, 20 are formed from any of a variety of dielectric materials such as oxides, sulfides, nitrides, fluorides, carbides, or mixtures thereof, and protect the recording layer 18 from water vapor and other gases. Furthermore, these dielectric layers are able to increase the difference in reflectance between before and after optical recording within the recording layer 18 following optical recording by using interference light, and the type of material and the thickness of the layers is selected appropriately in accordance with the optical design and the thermal design of the optical recording medium 10.

Furthermore, as described above, the first and second vice-recording layers 18A, 18B that form the recording layer 18 contain Al and Sb as the primary component metals, and the layers may contain only these metals, or may also comprise other added elements.

If other elements are added, then the primary component metal content within each vice-recording layer preferably accounts for at least 80 atom %, and even more preferably 90 atom % or greater of the layer. If the content of the primary component metal in a vice-recording layer is too low, then increasing the thermal stability of the recording marks to a satisfactory level becomes difficult.

Elements that can be added to the first vice-recording layer 18A comprising Al as the primary component preferably include at least one metal element that improves corrosion resistance such as Cr, Ti or Ni, whereas elements that can be added to the second vice-recording layer 18B comprising Sb as the primary component preferably include at least one element belonging to groups IIIb, IVb, Vb or VIb. However, the second vice-recording layer 18B is most preferably formed solely from Sb.

In addition, in the recording layer 18, the first vice-recording layer 18A and the second vice-recording layer 18B are in direct contact, but an intervening layer (not shown in the drawing) comprising another element as the primary component can also be provided between the two layers.

Examples of the other element contained within the intervening layer include at least one of the elements used as additional elements in the first vice-recording layer 18A or the second vice-recording layer 18B. The intervening layer can also be constructed of a compound with a melting point within a range from 500 to 1000° C. The thickness of this intervening layer is preferably no more than 5 nm, and even more preferably no more than 3 nm, as if the intervening layer is too thick, the mixing of the Al and Sb can be impeded.

Furthermore, the melting points of the primary component metals within the first and second vice-recording layers 18A, 18B are both preferably 550° C. or higher. If a vice-recording layer comprises a primary component metal with a low melting point, then during playback or storage of the medium under conditions of high temperature, diffusion can proceed via a solid phase reaction, leading to a deterioration in the reproductive durability and the storage reliability.

As described above, in the recording layer 18 formed by laminating two vice-recording layers, even at a temperature less than the melting point of the first and second vice-recording layers 18A, 18B, diffusion can occur and the reflectance can change via a solid phase reaction. For example, in the case of a combination of Al and Sb as the primary component metals, a satisfactory solid phase reaction can be generated at temperatures greater than 400° C. and less than the melting points.

However, in order to achieve high-speed recording, it is preferable to utilize diffusion by liquid phase reaction, which offers faster diffusion, and consequently when the recording light is irradiated, at least one of the first and second vice-recording layers 18A, 18B should preferably melt, and cases in which all of the vice-recording layers melt are even more preferred.

In such cases, in order to increase the recording sensitivity, the melting point of the primary component metal in at least one of the first and second vice-recording layers 18A, 18B, and preferably in both of the layers, is no more than 1000° C. In the above example, the melting points of Al and Sb are close in terms of temperature, and so melting both vice-recording layers 18A, 18B simultaneously is simple.

Furthermore, in order to achieve high-speed recording, the melting points of the primary component metals contained within each of the vice-recording layers are preferably close in terms of temperature, and specifically, the melting points of the vice-recording layers preferably fall within a temperature range with a width of no more than 200° C., and even more preferably no more than 100° C.

Even in those cases in which the recording reaction proceeds at a temperature that is less than the melting points of the primary component metals, provided the melting points of the primary component metals are close to each other, both vice-recording layers can be converted to an activated state, enabling the recording reaction to proceed at a comparatively faster rate. In the above example, the melting points of Al and Sb are sufficiently close to one another.

In the optical recording medium 10 according to this embodiment, it is thought that the primary component metals of the first and second vice-recording layers 18A, 18B are converted to a mixed state within the recording marks, and either exist as an intermetallic compound, or even if an intermetallic compound is not generated, at least exist as a mixture in which the primary component metals are bonded together.

For example, in the case of a recording layer 18 formed from a first vice-recording layer 18A comprising Al as the primary component and a second vice-recording layer 18B comprising Sb as the primary component, it is thought that the intermetallic compound AlSb is generated. Intermetallic compounds such as AlSb need not undergo crystal growth, and even if they exist in a micro crystalline state that cannot be detected by X-ray diffraction, recording is still possible.

Furthermore, the fact that the thermal stability of the reaction products within recording marks formed on the recording layer 18 is greater than the thermal stability of the unrecorded, laminated structure of the first and second vice-recording layers 18A, 18B is a feature of the present invention.

Specifically, this means that if a recording light (laser light) of a power level sufficient for forming recording marks is irradiated onto a recording layer 18 on which recording marks have already been formed, then the type of mixing and change in reflectance described above occurs in those areas of the recording layer 18 that have not been subjected to prior mixing, whereas in those areas in which a recording mark has already been formed, the irradiation of the recording light causes no change in the reflectance.

The melting point of Al is 660° C., and the melting point of Sb is 631° C. Both of these metals display adequate thermal stability in a simple state, and are able to be melted by irradiation with laser light. Furthermore, reaction of Sb and Al generates an intermetallic compound AlSb (melting point: 1060° C.), which has a much higher melting point than either of the simple metals, and is stable at both low and high temperatures, with no change in the crystalline structure.

Even if the optical recording medium 10 is stored in a high temperature environment following recording, the recording marks formed from the above reaction product remain stable and are unlikely to change. When the formed recording marks are read, a comparatively low power reproduction laser is irradiated onto the medium, and the temperature of the recording layer 18 rises several dozen ° C. in the irradiated area. With recording marks of low thermal stability, playback, and particularly repeated reproduction, can cause changes to the recording marks, but in this optical recording medium 10, the recording marks are very unlikely to change under reproduction, and display excellent playback durability.

In addition, because the thermal stability of the recording marks in the optical recording medium 10 of the present invention is high, the phenomenon in which recording results in the deletion of recording marks in adjacent tracks (cross erase) is effectively non-existent. As a result, the recording track pitch can be narrowed, which is effective for high density recording.

In contrast, in the case in which two metal layers of differing composition are heated and diffused instantaneously by laser light, and the product generated by this diffusion is in a state of non-equilibrium, for example in the case in which the product is a eutectic mixture or a semi-stable structure, heating or long term storage at room temperature causes a change in state (such as a phase separation) to generate a state of equilibrium. As a result, a recording mark formed from such a product in a state of non-equilibrium displays markedly inferior thermal stability, and poorer reproductive durability and storage reliability when compared with a recording mark in the optical recording medium 10 of the present invention.

The thickness of the recording layer 18, in other words the combined thickness of the first and second vice-recording layers 18A, 18B is preferably from 3 to 50 nm, and even more preferably from 5 to 20 nm. If the recording layer 18 is too thin, then ensuring an adequate difference in reflectance of the recording marks following optical recording is difficult, whereas if the recording layer 18 is too thick, the heat capacity of the layer increases, causing a deterioration in the recording sensitivity.

As the thickness of the recording layer increases, the reflectance also increases to a certain degree, but there is a limit to the reflectance of the thin metal film material used, and increasing the thickness substantially has a deleterious effect in terms of increasing the quantity of material and increasing the production tact time. In addition, in the case of a thicker recording layer, the laser power must be increased accordingly, as shown in the example 3 and FIG. 4 described below, and even if a provisional recording is made, irregularities develop in the diffusion and mixing of the recording marks through the depth direction of the recording layer, which imparts a negative effect on the produced signal quality. For the above reasons, the maximum thickness of the recording layer is 50 nm, and preferably 20 nm.

The thickness of each of the vice-recording layers is preferably from 1 to 30 nm, and even more preferably from 2 to 20 nm. If the vice-recording layers are too thin, then ensuring an adequate difference in reflectance following optical recording is difficult, whereas if the vice-recording layers are too thick, the heat capacity of the recording layer 18, which comprises the laminated vice-recording layers, increases, causing a deterioration in the recording sensitivity.

The thickness of each vice-recording layer may be appropriately determined so that recording marks with high thermal stability and large reflectance difference values can be formed. For example, in the case of a combination of a vice-recording layer with Al as the primary component and a vice-recording layer with Sb as the primary component, it is thought that an intermetallic compound with a 1:1 bonding ratio between Al and Sb is formed, and consequently the thickness of each of the vice-recording layers is preferably set so that the ratio (atom ratio) between Al and Sb within the recording layer 18 does not vary significantly from a 1:1 ratio.

Next is a detailed description of a second embodiment of the present invention.

Figure 2:
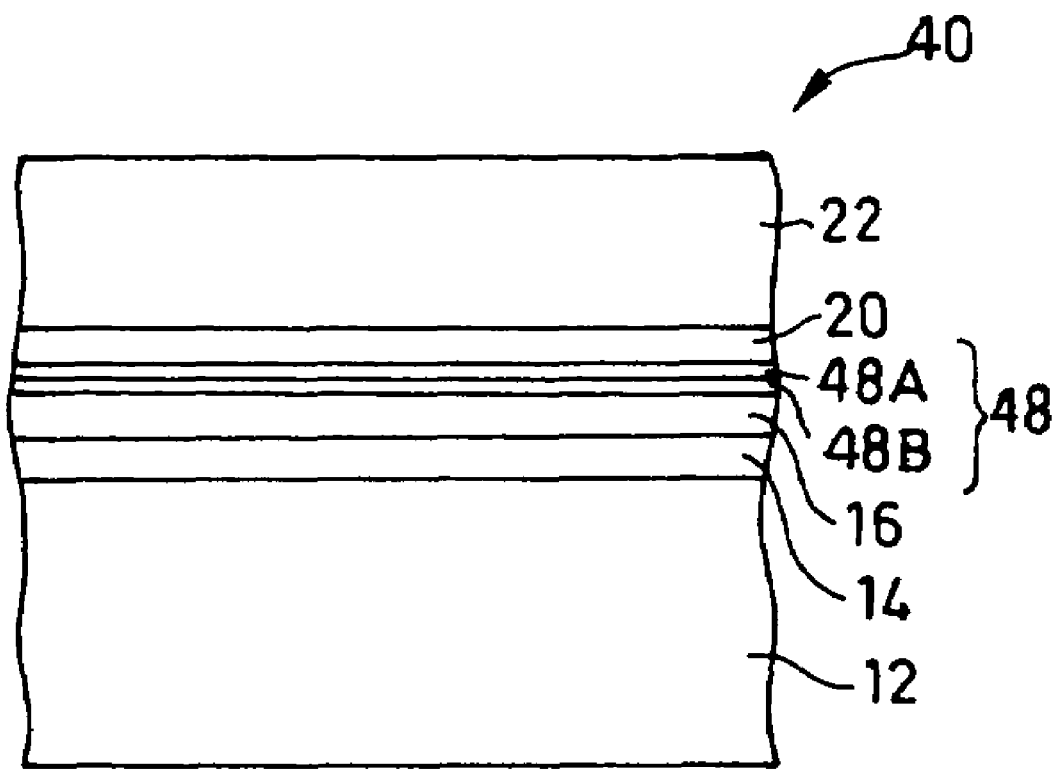
FIG. 2 is a cross-sectional view showing an enlarged schematic representation of a high-speed, write-once type optical recording medium according to a second embodiment of the present invention.

As shown in FIG. 2, an optical recording medium 40 of this second embodiment is of a similar construction to the optical recording medium 10 according to the first embodiment, and comprises a reflective layer 14, a second dielectric layer 16, a recording layer 48, a first dielectric layer 20, and a light transmission layer 22 provided sequentially on top of a support substrate 12, and by irradiating laser light of a wavelength from 200 to 450 nm, for example blue laser light of wavelength 405 nm, from a recording laser light source 24, through the light transmission layer 22 and onto the recording layer 48, the reflectance of the irradiated area can be changed, generating a recording mark.

The recording layer 48 is different from the recording layer 18, and is formed by laminating a first vice-recording layer 48A comprising Si as the primary component, and a second vice-recording layer 48B comprising Cu as the primary component, and when blue laser light is irradiated as recording light onto this laminated recording layer, then within the irradiation area, the Si and Cu that represent the primary component metals contained within the first and second vice-recording layers 48A, 48B undergo mixing, changing the reflectance of the irradiated area, and this becomes a recording mark. Because this type of mixing reaction of the two primary component metals is irreversible, the recording layer 48 is capable of write-once type optical recording.

The structures of the support substrate 12, the first and second dielectric layers 20, 16, and the light transmission layer 22 are identical with those described for the optical recording medium 10, and their descriptions are omitted here.

In the same manner as the recording layer 18, the thickness of the recording layer 48 is from 3 to 50 nm, and preferably from 5 to 20 nm.

Furthermore, the types of materials used for the light transmission layer 22 and the first dielectric layer 20, and the thickness of these layers, are also determined in the same manner as the optical recording medium 10.

In addition, as described above, the first and second vice-recording layers 48A, 48B that form the recording layer 48 contain Si and Cu as the primary component metals, and the layers may contain only these metals, or may also comprise other added elements.

If other elements are added, the Si content within the first vice-recording layer 48A preferably accounts for at least 80 atom %, and even more preferably 90 atom % or greater of the layer, and in a practical sense, layers formed solely from Si are the most preferred. If the content of the primary component metal, namely Si, in the vice-recording layer is too low, the magnitude of the change in reflectance of the recording marks decreases, resulting in a decrease in C/N and inviting jitter variation.

Furthermore, in the case where Si and Cu are used as the primary component metals, using solely Cu in the second vice-recording layer 48B results in a decrease in the storage reliability, and consequently other elements are preferably added to the layer. There are no particular restrictions on the content of these additives, provided they do not exceed the Cu content, and at least one element of Sn, Al, Zn, Au, Ag, Ni, P, Ti, Cr, Mn, Fe, Mg, Si, and Ge is preferably added, and from the viewpoint of increasing corrosion resistance, Al, Zn, Au, Sn, and Mg are particularly preferred. Atom % values of $5 \leq Al<45$, $2 \leq Zn<45$, $5 \leq Mg<30$, $5 \leq Au<45$, $2 \leq Si<30$ are particularly desirable.

Elements that can be added to the first vice-recording layer 48A comprising Si as the primary component preferably include at least one element belonging to groups IIIb, IVb, Vb or VIb, and at least one element of Sn, Al, Zn, Au, Ag, Ni, P, Ti, Cr, Mn, Fe, Mg, Si, and Ge is preferred, and from the viewpoint of increasing corrosion resistance, Al, Zn, Au, Sn, and Mg are particularly preferred.

In addition, the fact that the recording layer 48 may incorporate an intervening layer comprising another element as the primary component between the first and second vice-recording layers 48A, 48B, as well as the nature of the other element used for the intervening substance and the thickness of the layer, are as described for the optical recording medium 10.

In the optical recording medium 40 according to this embodiment, the primary component metals of the first and second vice-recording layers 48A, 48B are converted to a mixed state within the recording marks.

As for the first embodiment, even if the optical recording medium 40 is stored in a high temperature environment following recording, the recording marks formed from the above reaction product remain stable and are unlikely to change, the recording marks are unlikely to change under repeated reproduction and display excellent reproductive durability, and furthermore, cross erase during recording is effectively non-existent, meaning the recording track pitch can be narrowed, which is effective for high density recording.

The thickness of the recording layer 48, in other words the combined thickness of the first and second vice-recording layers 48A, 48B, is also as described for the optical recording medium 10.

The primary component metals in the first and second vice-recording layers described above were Al/Sb or Si/Cu, but this combination of primary component metals may also be any combination selected from the group consisting of Ag/Si, Zn/Si, Au/Si, Al/Ge, Ag/Ge, Zn/Ge, and Au/Ge. Any of these combinations is able to generate the same actions and effects as those described for the Al/Sb or Si/Cu combinations.

In the optical recording medium 10 according to the aforementioned embodiment, the recording layer 18 was provided between the first and second dielectric layers 16, 20, but the present invention is not limited to this structure, and the recording medium need not necessarily have a dielectric layer or layers provided on one side or both sides.

Furthermore, the recording layer 18 was formed from the first and second vice-recording layers 18A, 18B, but any recording layer 18 that comprises at least two vice-recording layers is suitable, and three or more vice-recording layers are also possible, and either of the vice-recording layers can be positioned on the irradiation side of the medium.

In addition, the light transmission layer 22 may be any layer that protects the recording layer 18 and allows transmission of the recording and playback light, and the material for the layer is not limited to sheet members formed from ultraviolet light curing resins or polycarbonate.

Furthermore, in the optical recording medium 10 according to the aforementioned embodiment, a reflective layer formed from silver alloy was used, but the present invention is not limited to this case, and a reflective layer need not necessarily be used. Furthermore, any material that reflects the recording and playback light can be used as the reflective layer material, and metal (including metalloid) films, and dielectric multi-layered films are suitable.

Next is a description of a method of recording information onto a high-speed, write-once type optical recording medium 10 (or 40) such as that described above, and an optical recording apparatus for performing such recording.

Figure 3:
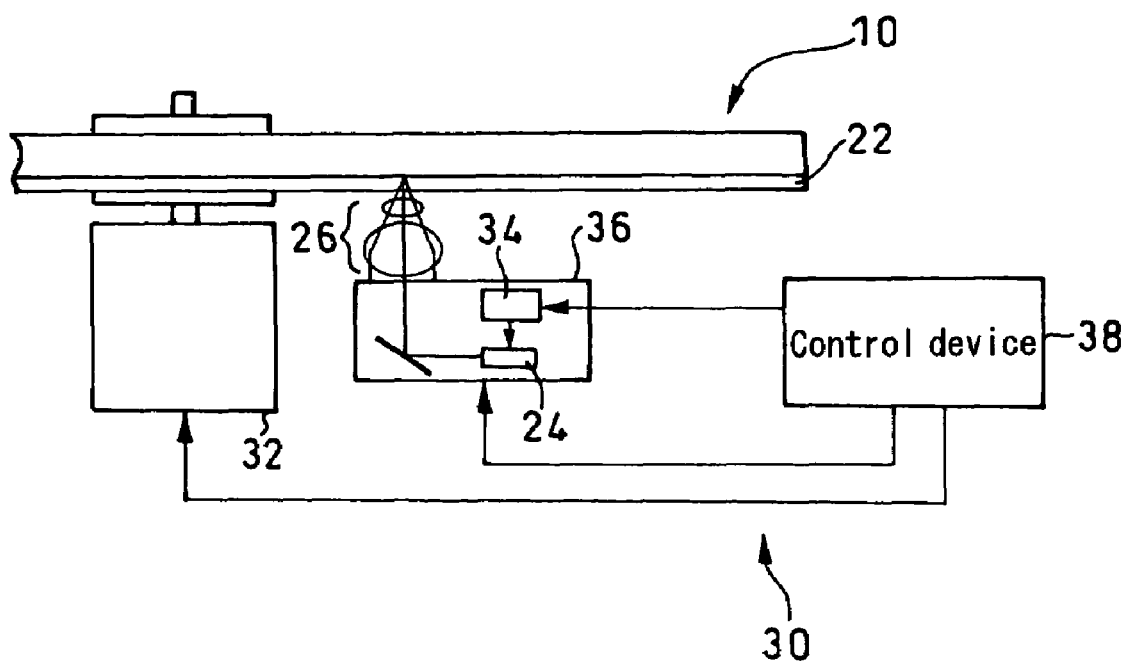
FIG. 3 is a block diagram showing an optical recording apparatus used for conducting optical recording on the same high-speed, write-once type optical recording medium.

FIG. 3 shows an optical recording apparatus 30 according to an embodiment of the present invention, comprising a motor 32 for rotating the disc shaped optical recording medium 10, the aforementioned laser light source 24, a laser driver 34 for driving this laser light source 24, an optical head 36 that incorporates the laser light source 24 and the objective lens 26, for controlling the irradiation position of the laser light on the recording layer 18, and a control device 38 for controlling the laser driver 34, the motor 32 and the optical head 36.

The laser light source 24, under the control of the control device 38, emits laser light via the laser driver 34 in accordance with predetermined information.

The optical head 36 follows the recording track formed in the optical recording medium 10, and moves the objective lens 26, and the recording layer 18 of the optical recording medium 10 moves in accordance with the rotation of the motor 32, enabling sequential irradiation of the recording layer 18.

In this example, the control device 38 controls the motor 32, the laser driver 34, and the optical head 36 so that the speed of the motor 32 and the laser light emitted from the laser light source 24 are capable of achieving recording at a recording transfer rate of at least 35 Mbps.

In the above embodiments, the laser light source 24 emits blue wavelength light of wavelength 405 nm, but the present invention can also be applied to laser light with a wavelength shorter than blue wavelength light, and for example, purple wavelength light could also be used. In the above embodiments, the objective lens 26 is a double objective lens with a numerical aperture of 0.85, but the present invention can be applied to other objective lenses with numerical apertures of 0.8 or greater. Furthermore, the present invention can be applied to high-speed, write-once type optical recording media, optical recording methods, and optical recording apparatus used for recording transfer rates of 35 Mbps or higher.

EXAMPLE 1

Using the optical recording apparatus 30 and the optical recording medium 10 described above, the characteristics were evaluated.

The structure of each of the layers of the optical recording medium 10 is shown below.

Reflective layer 14: silver alloy 50 nm

Dielectric layers: $ZnS+SiO_2$ (80:20 mol %)

First dielectric material 20: 80 nm, second dielectric material 16: 95 nm First vice-recording layer 18A: AlCr (98:2 at %) 4 nm Second vice-recording layer 18B: Sb 6 nm The measurement conditions used were as shown below.

Recording signal: 1-7 modulated signal (bit length 0.12 μm)

Recording linear velocity: 5.3 m/s (equivalent to 35 Mbps), 10.6 m/s (equivalent to 70 Mbps)

Reproductive power: 0.4 mW

Under the above conditions, and using a multi-pulse strategy from the optical recording apparatus 30, when signals were recorded onto, and played back from, the optical recording medium 10, the following results were achieved.

35 Mbps: recording power 4 mW, jitter 7.5%

70 Mbps: recording power 4.5 mW, jitter 8.6%

Good signal quality was achieved at high-speed recording of 35 Mbps or greater, and the recording power was also less than 5 mW, which represents a practical level.

EXAMPLE 2

Using the optical recording apparatus 30 and the optical recording medium 10 described above, the reflectance of the optical recording medium prior to, and following recording was evaluated.

The structure of each of the layers of the optical recording medium 10 is shown below (no reflective layer).

Dielectric layers: $ZnS+SiO_2$ (80:20 mol %)
First dielectric material 20: 60 nm, second dielectric material 16: 70 nm
First vice-recording layer 18A: AlCr (98:2 at %)
Second vice-recording layer 18B: Sb The ratio between the thickness of the first vice-recording layer 18A and the thickness of the second vice-recording layer 18B was set to 1:1.5, and the thickness of the recording layer was varied from 0 to 21 nm, while recording was performed using the optical recording apparatus described above, and the reflectance prior to, and following recording was evaluated using the optical recording apparatus.

The results are shown in FIG. 3.

Figure 4:
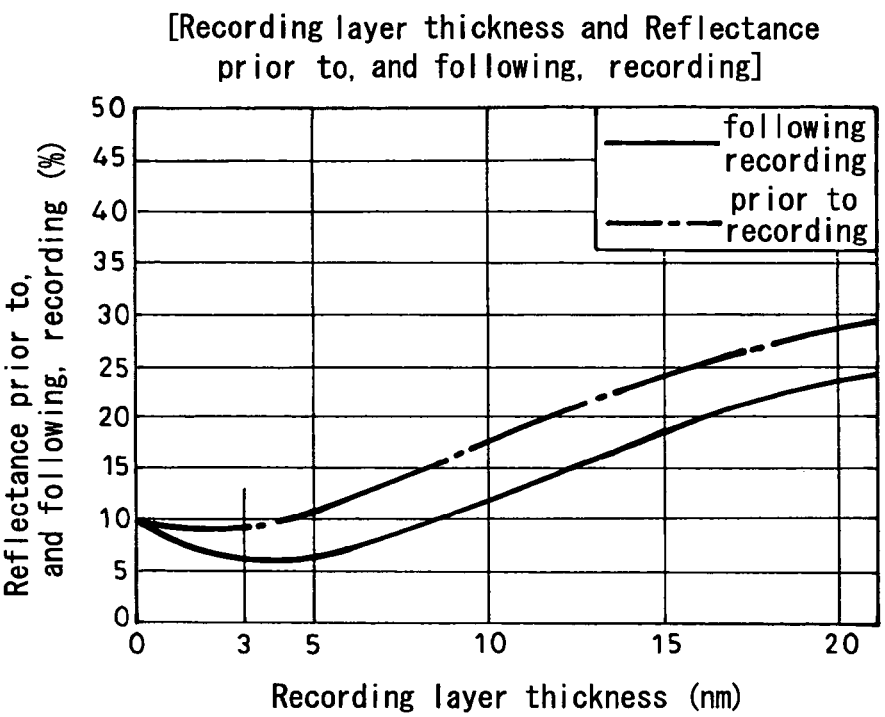
FIG. 4 is a chart showing the relationship between the reflectance prior to, and following, optical recording, and the thickness of the recording layer, for the optical recording medium of an example 2 of the present invention.

As is evident from FIG. 4, provided the thickness of the recording layer is at least 3 nm, the difference in reflectance is at least 3%, which enables detection as a signal, but if the thickness is less than 3 nm, the difference in reflectance is small, the signal quality is poor, and detection of the signal becomes difficult.

EXAMPLE 3

Using the optical recording apparatus 30 and the optical recording medium 10 described above, the laser power required to enable recording of the optical recording medium (the laser power at which the reflectance begins to change) was measured.

The structure of each of the layers of the optical recording medium 10 is shown below (no reflective layer).

Dielectric layers: $ZnS+SiO_2$ (80:20 mol %)
First dielectric material 20: 60 nm, second dielectric material 16: 70 nm
First vice-recording layer 18A: AlCr (98:2 at %)
Second vice-recording layer 18B: Sb
The measurement conditions used were as shown below.
Recording signal: Maximum mark 8T single signal of a 1-7 modulated signal (bit length 0.12 μm)
Recording linear velocity: 5.3 m/s (equivalent to 35 Mbps), 10.6 m/s (equivalent to 70 Mbps)
Reproductive power: 0.4 mW
Recording was conducted using the optical recording apparatus, and the recording power that generated a change in reflectance of at least 1% was recordable laser power.

Figure 5:
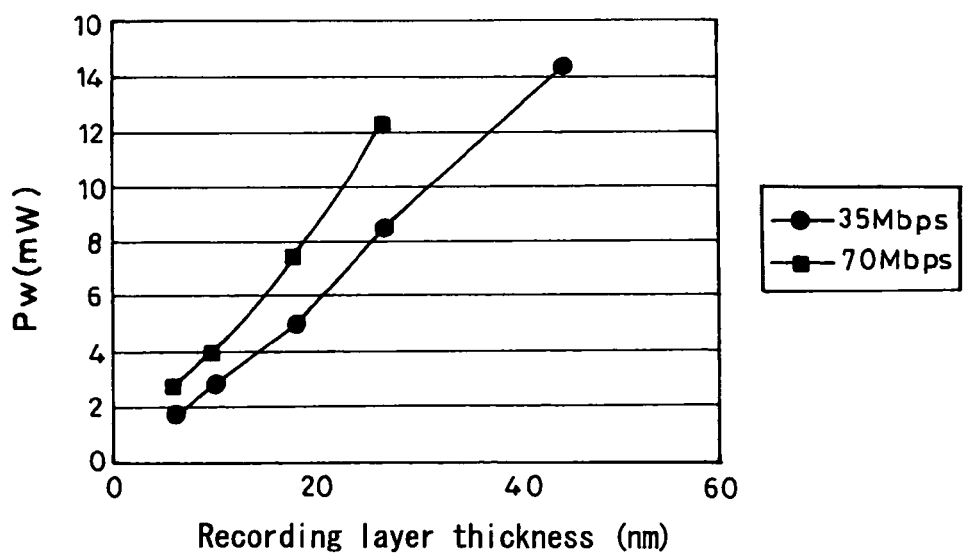
FIG. 5 is a chart showing the relationship between the write-once laser power and the thickness of the recording layer, for the optical recording medium of an example 3 of the present invention.

The results are shown in FIG. 5.

EXAMPLE 4

Reflective layer 14: silver alloy 100 nm
Dielectric layers: $ZnS+SiO_2$ (80:20 mol %)
First dielectric material 20: 25 nm, second dielectric material 16: 28 nm
First vice-recording layer 48A: Si 5 nm
Second vice-recording layer 48B: Cu 5 nm
The measurement conditions used were as shown below.
Recording signal: 1-7 modulated signal (bit length 0.12 μm)
Recording linear velocity: 5.3 m/s (equivalent to 35 Mbps), 10.6 m/s (equivalent to 70 Mbps), 21.2 m/s (equivalent to 140 Mbps)
Reproductive power: 0.4 mW Under the above conditions, and using a multi-pulse strategy from the optical recording apparatus 30, when signals were recorded onto, and reproduced from, the optical recording medium 40, the following results were achieved.
35 Mbps: recording power 4.0 mW, jitter 7.7%
70 Mbps: recording power 4.2 mW, jitter 7.8%
140 Mbps: recording power 4.6 mW, jitter 8.9%

Good signal quality was achieved at high-speed recording of 35 Mbps or greater, and the recording power was also less than 5 mW, which represents a practical level.

EXAMPLE 5

Reflective layer 14: silver alloy 100 nm
Dielectric layers: $ZnS+SiO_2$ (80:20 mol %)
First dielectric material 20: 23 nm, second dielectric material 16: 28 nm
First vice-recording layer 48A: Si 5 nm
Second vice-recording layer 48B: CuAlAu 5 nm (64:23:13 at %)
The measurement conditions used were as shown below.
Recording signal: 1-7 modulated signal (bit length 0.12 μm)
Recording linear velocity: 5.3 m/s (equivalent to 35 Mbps), 10.6 m/s (equivalent to 70 Mbps), 21.1 m/s (equivalent to 140 Mbps)
Reproductive power: 0.4 mW Under the above conditions, and using a multi-pulse strategy from the optical recording apparatus 30, when signals were recorded onto, and reproduced from, the optical recording medium 40, the following results were achieved.
35 Mbps: recording power 4.0 mW, jitter 6.7%
70 Mbps: recording power 4.2 mW, jitter 7.5%
140 Mbps: recording power 4.5 mW, jitter 8.8%

Good signal quality was achieved at high-speed recording of 35 Mbps or greater, and the recording power was also less than 5 mW, which represents a practical level.

Using the optical recording apparatus 30, a laser of 15 mW or greater cannot be generated, and consequently recording could not be performed on a sample with a recording layer with a thickness of 60 nm.

The maximum possible output of blue laser light from an optical recording apparatus is currently less than 15 mW, and consequently in order to enable a recording transfer rate of 35 Mbps or greater with an optical recording apparatus that utilizes a blue laser, the thickness of the recording layer must be no more than 50 nm.

Furthermore, provided the thickness of the recording layer is no more than 20 nm, then even using the types of blue laser with an output of less than 10 mW that are currently being investigated for potential mass production, recording of at least 35 Mbps (70 Mbps) is possible, making the medium suitable as a high-speed, write-once type optical recording medium that utilizes blue laser light.

INDUSTRIAL APPLICABILITY

The present invention is structured in the manner described above, and consequently by using laser light that is either blue or an even shorter wavelength, a high-speed, write-once type optical recording medium, an optical recording method, and an optical recording apparatus can be achieved.

The invention claimed is:

1. A high-speed, write-once type optical recording medium comprising at least a recording layer and a light transmission layer formed sequentially on top of a support substrate, wherein that said recording layer is formed by laminating at least two vice-recording layers, each of which comprises one type of metal as a primary component, and irradiation of a laser light that is either blue or an even shorter wavelength, from a side of said light transmission layer, causes diffusion and mixing of primary component metals contained within each of said vice-recording layers, this mixing enables formation of a recording mark based on an irreversible change in reflectance, and recording can be conducted at a recording transfer rate of at least 35 Mbps by using a system in which a thickness of said recording layer is from 3 to 50 nm, a wavelength of said laser light is from 200 to 450 nm, and which utilizes a lens system having an objective lens used for irradiation of said laser light, a numerical aperture of the objective lens being at least 0.8, further wherein at least one layer of said vice-recording layers comprises Al as a primary component, and at least one other layer is provided adjacent to said vice-recording layer comprising Al as a primary component and comprises Sb as a primary component, and irradiation of said laser light causes diffusion and mixing of said Al and Sb contained within each of said vice-recording layers.

2. The high-speed, write-once type optical recording medium according to claim 1, wherein a thickness of said vice-recording layer is from 1 to 30 nm.

3. The high-speed, write-once type optical recording medium according to claim 1, wherein a thickness of said light transmission layer is from 50 to 150 μm.

4. A high-speed, write-once type optical recording medium comprising at least a recording layer and a light transmission layer formed sequentially on top of a support substrate, wherein that said recording layer is formed by laminating at least two vice-recording layers, each of which comprises one type of metal as a primary component, and irradiation of a laser light that is either blue or an even shorter wavelength, from a side of said light transmission layer, causes diffusion and mixing of primary component metals contained within each of said vice-recording layers, this mixing enables formation of a recording mark based on an irreversible change in reflectance, and recording can be conducted at a recording transfer rate of at least 35 Mbps by using a system in which a thickness of said recording layer is from 3 to 50 nm, a wavelength of said laser light is from 200 to 450 nm, and which utilizes a lens system having an objective lens used for irradiation of said laser light, a numerical aperture of the objective lens being at least 0.8, further wherein at least one layer of said vice-recording layers comprises Si as a primary component, and at least one other layer is provided adjacent to said vice-recording layer comprising Si as a primary component and comprises Cu as a primary component, and irradiation of said laser light causes mixing of said Si and Cu contained within each of said vice-recording layers.

5. The high-speed, write-once type optical recording medium according to claim 4, wherein a thickness of said vice-recording layer is from 1 to 30 nm.

6. The high-speed, write-once type optical recording medium according to claim 4, wherein a thickness of said light transmission layer is from 50 to 150 μm.

* * * * *